March 17, 1931. T. B. SLATE 1,796,909
REFRIGERATING APPARATUS AND METHOD
Original Filed Sept. 27, 1924   2 Sheets-Sheet 1

INVENTOR
Thomas B. Slate
BY
George C. Shean
ATTORNEY

Patented Mar. 17, 1931

1,796,909

UNITED STATES PATENT OFFICE

THOMAS B. SLATE, OF GLENDALE, CALIFORNIA, ASSIGNOR, BY MESNE ASSIGNMENTS, TO AMERICAN PATENTS DEVELOPMENT CORPORATION, OF NEW YORK, N. Y., A CORPORATION OF DELAWARE

REFRIGERATING APPARATUS AND METHOD

Original application filed September 27, 1924, Serial No. 740,162. Divided and this application filed February 10, 1931. Serial No. 514,853.

My present invention relates to refrigeration of the type set forth in my copending application Ser. No. 685,482, filed January 10, 1924, now Patent No. 1,511,306, granted October 14th, 1924.

In said patent I have described and claimed various forms of refrigerators, each characterized by having solidified carbon dioxide enclosed within the refrigerator and discharging gaseous refrigerant in such a way that the gas affords insulation. When discharged into the refrigerated space, it prevents mold and excludes air from the materials that are refrigerated, and otherwise refrigerates and preserves the same.

My present invention includes certain of the general features above described, but relates more specifically to refrigerating chambers and to the container of solid carbon dioxide which is located in the upper part of the chamber and is adapted to be charged with frozen carbon dioxide which has been previously manufactured elsewhere. This container is gas-tight except for the provision of a high level vent for escape of the gas, in this case. It results that when the container is charged with the frozen carbon dioxide, the heavy cold gas evolved therefrom displaces the air and drives it upward, so that the container becomes filled with pure, dry gas which protects the frozen carbon dioxide and greatly decreases its sublimation rate.

As stated in application No. 740,162, of which this case is a division, Figs. 7 to 10 inclusive of Patent No. 1,511,306, show a single container and this may be a large balsa wood box into which all of the frozen carbon dioxide is charged. The heat absorption and direct chilling of the atmosphere is localized at and upon this exterior surface, which thus becomes in effect a refrigerant source operating at predetermined moderate temperatures notwithstanding the fact that it is activated from within by an intensely cold primary source, namely, the solid carbon dioxide. The down draft of the thus chilled atmosphere is correspondingly localized. The evolution of the gas and outpouring of the refrigerant gas is similarly localized.

In Figs. 1 and 2 of said patent, the distribution of the cooling media in the car is improved by discharging the refrigerant gas from the container at one end of the car through a pipe leading to the far end of the car, and there is an advantage because the refrigerant gas carries a substantial part of the refrigerant values while the direct heat absorption at the container accounts for the balance of the refrigerant effect.

My invention concerns further improvement in the distribution of the direct heat absorption factor of refrigeration, both as to the use of metal in the container and as to use of a plurality of containers. I preferably subdivide, multiply and elongate the container element so that the direct heat absorption occurs in regions widely distributed throughout the length of the car. The discharge of gas is also subdivided and distributed, but preferably to a less extent in the case of a refrigerator car, the distribution points being adjacent the danger point of the car, namely, the central side doors through which the car is loaded. In this arrangement, the container absorption surface being distributed throughout a large part of the upper portion of the car acts somewhat like a thermostat and responds directly to changes in temperature of the atmosphere throughout the refrigerator. Absorbing heat throughout a widely distributed region, the increase or decrease in the amount of refrigerant gas which the container discharges is directly responsive to storage conditions throughout the car. Furthermore, I believe I am the first to discover, and utilize certain governing factors and to apply them in an elongated container affording the desired distributed refrigeration.

A railway refrigerator car with my complete preferred equipment, loaded and supplied with the thousands of pounds of solid cabon dioxide will tend to be self-governing for a long trip, and the very same equipment can be used with an initial charge of solid carbon dioxide sufficient only for a day or two or more, as desired, yet the self-governing tendencies and the temperatures will be the same and, for conditions otherwise the same, the smaller charge of the solid carbon dioxide will function for the shorter trip substantially the same as the many times greater charge required for the longer trip. Moreover, by dividing the same maximum refrigerant capacity among a suitable number of properly designed containers, suitably distributed in the car, and leaving one or more of the containers uncharged, the car will be self regulating for higher temperatures, say, around 36° F. to 42° F.; or around say 47°, as desired.

According to my present invention, the heat absorbing capacity of the containers may be determined almost entirely by the total heat absorbed from the outside through the walls of the refrigerator car or chamber because the other large factor of refrigeration, namely, heat generation by oxidizing reactions in a cargo of perishable products, such as dead fish or fresh (living) fruits, may be reduced to a minimum by relatively low temperature and exclusion of oxygen which results when the gas is discharged into the refrigerated space. A most desirable embodiment of my invention is where the total initial capacity of the containers will be sufficient, when properly governed, to maintain approximately water-freezing temperatures within desired limits, for the longest trip and the hottest weather for which the car is designed. My present invention combines two kinds of refrigeration, both of which may be controlled by the enclosing walls of the container which function in two ways; first, as exterior refrigerant surface, absorbing heat and establishing convection currents by direct contact with atmosphere within the car and thus yielding as moderate, above-freezing refrigeration, a major portion of the refrigerant value of the solid carbon dioxide; second, the walls conduct this heat to the interior of the container, where some of it is absorbed by the gas, but most of it disappears as latent heat used in producing a proportional amount of heavy refrigerant gas and this gas is utilized so as to yield the remaining part of the refrigerant value of the solid as lower temperature refrigeration.

Hence, as one of my steps toward self control for constant temperature, I make the container such that the rates at which heat is absorbed by the walls of the container and supplied to the solid carbon dioxide as latent heat for volatilizing it, are practically independent of whether the container has a full charge of the solid or only a relatively small fraction, say, 100 pounds where a full charge would be 1,000 pounds. To this end, I utilize the rather phenomenal fact discovered by me that by making, or lining, the interior of the insulated container with good conducting material such as sheet steel or aluminum, the solid carbon dioxide resting upon a relatively small area of the bare metal, will keep the interior of the container at a practically constant temperature, entirely around the circumference of the container and for a wide zone on either side. This does not mean that distant parts of the metal are maintained at approximately the same temperature as the spot on which the solid rests. There is some temperature gradient, according to distance, but where insulation is used, it prevents direct or rapid cooling and, in the preferred case, the temperature drop of over 100° F. between the interior and exterior of the container is so great that refrigeration of the external air (heat absorption therefrom) remains near enough constant for all practical purposes so long as there is some substantial amount of solid carbon dioxide left along the bottom of the container. The practical limit will be lowest where the solid carbon dioxide does not contain water ice or other non-melting impurities such as could operate to raise the melting point; or as heat insulation, preventing uniform heat absorption of the carbon dioxide from the metal. Obviously, the phenomenal heat collecting quality of the metal container is usable for distributing refrigerant values of the solid to remote points, regardless of how or whether insulation is used.

As all the absorbed heat goes into gas making without much change in temperature of the insulated metal lining, the lining itself becomes in effect a practically constant temperature source which does not change area during use as the frozen carbon dioxide necessarily does and hence the containers can be designed for any desired area, without any close reference to the amount of refrigerant contained therein. This affords great freedom in varying the amount of heat absorbing surface and thereby the rate of production of refrigerant values at any given temperature of the refrigerator.

It will be noted that increase of such area increases such rate and that the same effect is producible by decrease of insulation of the surface without changing its area, but in the latter case the result is produced by greater intensity of working of each unit area, instead of by having more units working at unchanged intensity.

My invention demonstrates that intensity as controlled by insulation is important. Moreover, the exterior transition surface where the convection of heat changes to conduction seems to be important as the crest of the dam where the relatively uniform heat of the atmosphere in the refrigerator starts its hundred degree drop to the temperature of the interior of the container. Hence my invention involves designing the containers to afford the desired refrigeration with only a relatively small normal temperature difference between the exterior surface of the container and the refrigerator atmosphere in which it is submerged. This may be accomplished by providing the container with insulation such that its external surface will operate at a temperature slightly below the desired refrigerator temperature, when said surface is exposed to air at said desired refrigerator temperature. A rough approximation for fresh fish and other products requiring near-freezing temperatures, may be attained by merely making the insulation such that when exposed to ordinary moist temperature, it will collect frost if said atmosphere is near or slightly below the freezing point of water, but will collect only dew when said atmosphere is at temperatures ten or fifteen degrees higher.

The temperature difference and the refrigerant value per unit surface being thus predetermined, and, so to speak standardized, I simply provide enough such surface to maintain the desired temperature for the particular refrigerator under average conditions of its use. The insulation being considerable, such area must be proportionally great and, in general, a reasonable overestimate for the exterior surface area of the containers is an advantage because it will provide for unusually hot weather and my other factors of governing are controlling enough to prevent freezing in cold weather.

A refrigerator car or chamber equipped with containers as described above tends to be strongly self-governing for constant temperature not only because of the above described great percentage change of temperature drop, upon slight warming or cooling of the atmosphere in the refrigerator, but also because of the peculiar mode of functioning of the solid carbon dioxide whereby only part of its refrigerant value is directed toward the exterior surface of the container, the other part being in the refrigerant gas that flows to the bottom of the car and exercises its cooling effect on said surface only in a round about way and after considerable time has elapsed. Consequently, the part of the refrigerator atmosphere that is engaged in supplying the increased amount of heat to the container does not encounter all of the increased refrigeration which it produces.

While these two factors are effective in opposition to temperature change, there may be conditions where there is a tendency to drift or shift of the range as a whole. In practice such drift will be the result of a slowly accumulating differential and I have discovered that with my large-area, low-differential containers, the moisture in the atmosphere within the car may be utilized as the "balance of power" sufficient to prevent excessive drift of temperature ranges and temperature differentials. Its great effectiveness seems partly due to the fact that by my method the amount of refrigeration to be controlled is relatively small, the heat generating reactions in the cargo being reduced to a minimum by low temperatures established in the mass of the cargo by proper utilization of gas below the freezing point of water, and control of its production by moisture functioning at and above said freezing point. As fish at about 25° F. and as practically all merchandise containing freezable water holds it in such form that the freezing point is below that of water, the basic minimum temperature allowed by this moisture control is high and effective enough for all refrigerator purposes.

I have discovered that this moisture governing based on the freezing point of water, can also be relied upon for stabilizing refrigerator temperatures substantially higher than the freezing point of water, by decreasing the effective heat absorbing area. In such cases, I prefer to use the same containers with the same insulation as for fish and other freezing point minimum, but I employ fewer of them for a like refrigerator space. Thus the refrigerator temperature will have to run up to a correspondingly higher temperature before a balance is reached where there is heat enough absorbed by the reduced container area to volatilize enough refrigerant gas to maintain the desired higher temperature. This wider temperature drop between the refrigerator atmosphere and container surface may not give quite as close governing, but the governing against freezing is even safer because the container frosts at high refrigerator temperatures and because the primary temperature margin of safety is greater.

The air and gas absorb and tenaciously hold certain minimum quantities of water down to and far below freezing and actual test seems to prove that a relatively small remnant of it in the atmosphere of the refrigerator will function as a balance wheel, its specific heat opposing temperature change and its latent heat operating by deposit or evaporation of dew near the dew point and of frost near the freezing point thereby releasing heat and drying the gas, thus making it a slower medium for transmission of heat from cargo to container, while evaporation has the opposite effect; each when and where most needed. Frost or dew on the container surfaces adds an effective layer of insulation, thus decreasing production of refrigerant gas, while melting of such frost or evaporation of dew has the opposite effect. The greater the area of the container surfaces relative to the volume of atmosphere in the refrigerator, and the closer up to the freezing point said surfaces are operating, the more important these effects will be. As explained above, these ratios can be made almost anything desired.

An important feature of my invention is the drying effect of the anhydrous carbon dioxide gas, and the great refrigerant economy due to the non-conducting quality of a relatively dry gaseous atmosphere, but even so, I find it desirable in certain cases to employ water containers, such as shallow pans, in the bottom of the car where the temperature is lowest, for the purpose of preventing the atmosphere from becoming too dry and also releasing latent heat by freezing in case the temperature falls to 32° F. for too long a period.

The significance and nature of the above and other self-governing factors and functions, may be more readily understood by brief reference to certain facts and phenomena with respect to carbon dioxide, some of which have been well known for more than half a century and others of which have been discovered by me.

Frozen carbon dioxide has a refrigerating value nearly twice that of water ice. Its melting point is about −114° F. where it absorbs heat in latent form, and vaporizes or "sublimates" directly to a gas, without any intermediate liquid state, the practically effective temperature of the gas being about −80° F. solid carbon dioxide, whether frozen directly or made as snow and then compressed, has a specific gravity nearly twice that of water-ice, a cubic foot of the solid carbon dioxide weighing somewhere between 50 pounds and 100 pounds, according to the degree of compression, and yielding about 8 cubic feet of gas per pound, measured at 32° F. Because of its low temperature and great specific gravity, such gas is nearly twice as heavy as the refrigerator air into which it is discharged. Consequently, when it escapes from the container into the relatively still atmosphere of the refrigerator chamber, it gravitates downward. There will be diffusion, and if the escaping gas has much velocity, there will be some mechanical mixing, but even so, the initial effect will be to build a pool of the cold carbon dioxide gas up from the bottom of the car, displacing the air and warmer carbon dioxide upwards as it rises.

I have found that there is in time established a tendency to stratification of the atmosphere, a relatively thin upper layer next the roof being mostly air and noticeably warmer than the lower layers, which are mostly carbon dioxide gas. The warm layer naturally increases and decreases in thickness with changes in temperature, particularly intensity of the sun's rays on the roof, and by disposing my containers with their upper surfaces within the range of ebb and flow of thickness of this layer, the thickening and downward extension of the layer brings it in bathing contact with greater areas of the container and thereby affords a magnified heat differential resulting in the production and discharge of an increased amount of the refrigerant gas, which continues until retreat of the warm layer, whether by discontinuance of the sun's heat or as a result of the excess refrigeration.

The upper warm air layer is particularly marked in refrigerator cars where the doors do not extend to the ceiling, there is practically no way in which the carbon dioxide can force out the last seven or eight inch layer of air that lies next the roof. I prefer to vent the roof to let it out, in which case the down spreading and retreat of the heat will still operate, but on a lower temperature range.

Because of the above special qualities of carbon dioxide gas and solid, my present invention is herein described in connection with frozen carbon dioxide only, but each point of novelty of my invention, as brought out, will make evident to those skilled in the art, whether and to what extent there are now or will be discovered hereafter, equivalents for the carbon dioxide.

In this connection, I need only note that the nitrogen constituent of liquid air is substantially lighter than the mixture of oxygen and nitrogen found in atmospheric air, and that the oxygen constituent which tends to boil off separately, after the nitrogen, is an active chemical agent and oxidizer which is practically prohibited for many special reasons.

Having thus described the important principles of my method for self-regulating refrigeration at a relatively high temperature range by means of an intense or low temperature refrigerant, I now describe apparatus whereby the various features of my method may be realized in almost any desired degree of completeness or perfection. Such apparatus is illustratively indicated in the accompanying drawings, wherein

In Figs. 1 to 4, I have shown my present invention as applied to a refrigerator car embodying my method of close temperature control for a narrow range, particularly near and above freezing, and particularly somewhat below the freezing point of water, as is practically essential for preservation of fresh fish and many other products.

Figure 1:
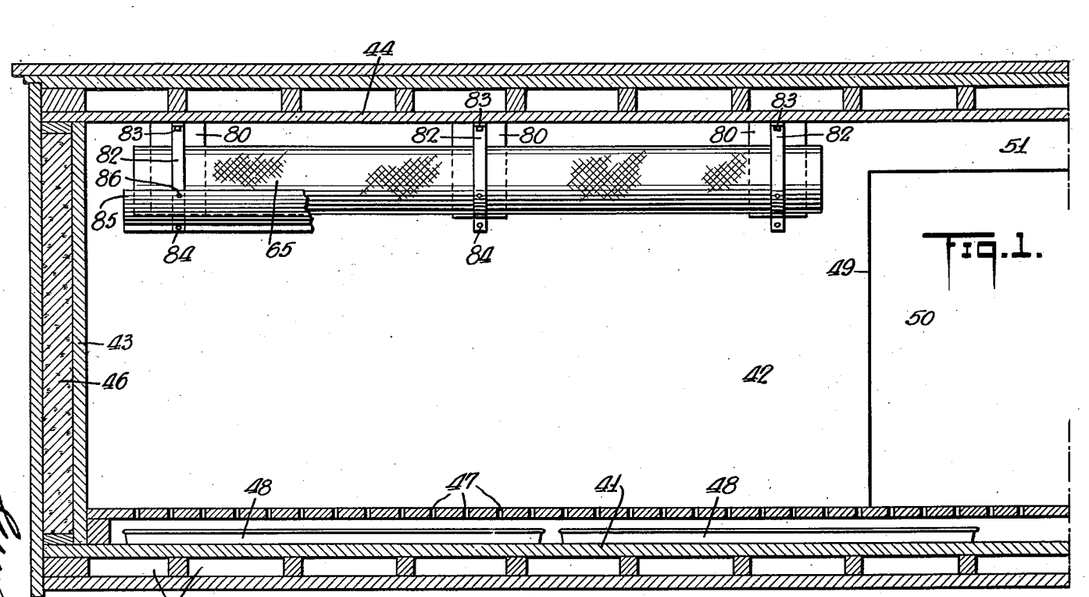
Fig. 1 is a vertical longitudinal section on the line 1—1 of Fig. 2, and shows one-quarter of a refrigerator car having equipment particularly adapted for the use of solid carbon dioxide in accordance with my preferred methods.
Figure 2:
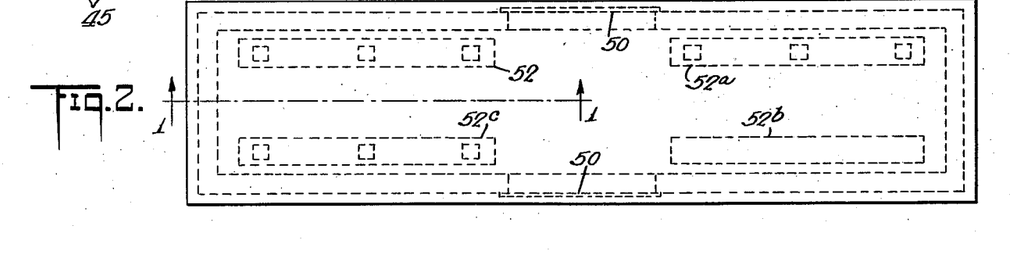
Fig. 2 is a top plan view showing the entire equipment for such a car.

As actually used by me, this equipment includes a refrigerator car of conventional construction, having a floor 41, side walls 42, end walls 43 and ceiling 44, of the usual double wall and interspace construction, affording heat insulation, either by dead air space as indicated at 45, or by cork, balsa wood or other insulating filling as indicated at 46. For purposes of my invention, I prefer to provide the car with a slat floor 47, elevated somewhat above the usual floor 41. This provides a space beneath the cargo into which the intensely cold gas may sink and circulate beneath all parts of the cargo until diffused, moistened, warmed and then displaced upward through the cargo by fresh supplies of cold gas flowing down from the refrigerating devices. If the cargo is not sufficiently moist, water may be supplied. For instance, the space below the floor may be supplied with shallow tanks of water indicated at 48, their structure being such that they will retain the water even under the violent bumping and jerking to which such cars are subjected. If the tanks have closed tops, freezing of the water in the tanks or in the atmosphere to which some of it may have evaporated will have the effect of releasing latent heat, preventing the temperature from falling much below freezing, even under trying weather conditions and with the apparatus designed for normal operation at approximately freezing point. In the case of unfrozen fish, a similar moisture supply may be insured by packing water ice with the fish. If temperature rises to around 33° F. such ice will melt slowly enough to keep the fish in a moist condition, notwithstanding the drying effect of the gas. Even at times when the water in the pans 48 is frozen or when the water ice packed with the fish is so cold that it does not actually melt, in either case, a substantial amount of said water ice will be evaporated and absorbed as moisture, by anhydrous carbon dioxide gas flowing in contact therewith. Moisture furnished in any of these ways is often of advantage for preventing overdrying of perishable products, independently of its function as a frost producing covering for the containers of the solid carbon dioxide. It will be noted further as to the combination of frozen carbon dioxide and frozen water in the same refrigerant chamber, that such combination may be utilized to advantage in keeping water ice from melting until emergency conditions arise, when release of its latent heat is most needed.

A refrigerator of the above or any other desired type is supplied with containers of capacity, insulation and surface area designed according to principles explained above. In the present case, the refrigerator space is about 40 feet long, 8 feet wide and 8 feet high, with the door openings 49, about 7 feet high by 8 feet wide, closed by doors 50. For a car of the above capacity, I provide four containers 52, 52a, 52b, 52c, each shown as cylindrical and about 12 inches in internal diameter by about 14 feet long, preferably arranged along the upper corners between side walls and roof on either side of the central doors, and preferably discharging their refrigerant gas at the ends nearest the doors where it is apt to be warmer.

These long, small-diameter containers are structurally convenient means whereby the necessary large quantities of solid carbon dioxide may be stored and absorb heat within a relatively warm, high-level, horizontally-extensive region or stratum of the refrigerator atmosphere; but they are even more important because they afford a large area horizontal support surface upon which the solid carbon dioxide melts down vertically with minimum change of length and minimum change of proximity to the surfaces through which the heat is absorbed.

The upper surfaces of the containers may be arranged 7 or 8 inches below the roof and extend horizontally, so that the upper layer of warm air or gas will contact with greater or less area of the container according as said layer grows thicker or thinner by greater or less heat penetrating the roof or by warm air or gas forced up from below.

Four such containers when fully loaded will hold about 2,000 pounds to 3,000 pounds of solid carbon dioxide, according as the solid is of average or maximum density, which will be sufficient to maintain a temperature of about 27° to 33° F. within the car for a period of 10 to 15 days or more, according to the outside weather conditions. On the dimensions above given, and allowing, say, 4 inches for thickness of insulation, these four containers will have about two-fifths the capacity, but their exterior heat absorbing surface will be approximately the same as for a single 5-foot cube balsa wood box. The advantage is that the heat absorbing area is distributed throughout the length and width of the car. Consequently, all of the convection currents will be diffused and coming from the nearest points below the container and flowing directly downward again. Furthermore, the refrigerant gas from the containers will be discharged at four distributed points adjacent the doors through which the car is loaded, where leaks are most likely to occur and where the containers do not extend their direct heat absorption surfaces.

Figure 3:
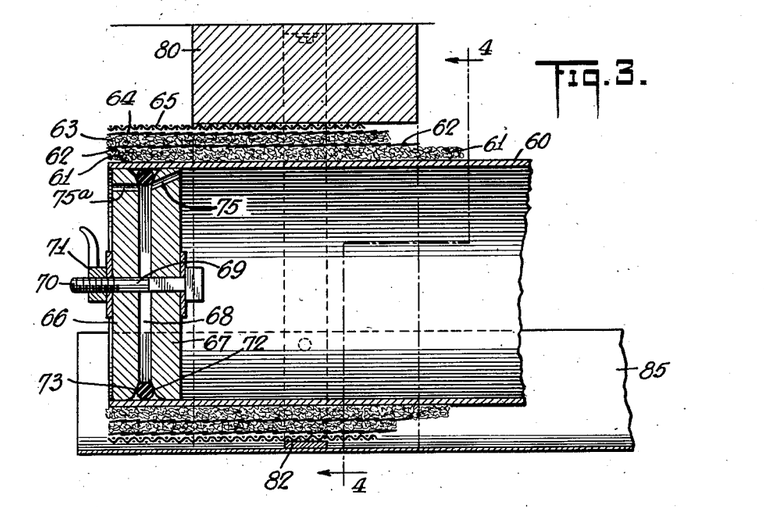
Fig. 3 is a vertical longitudinal section on the line 3—3 of Fig. 4, showing desirable details for the refrigerant container shown in Figs. 1 and 2.
Figure 4:
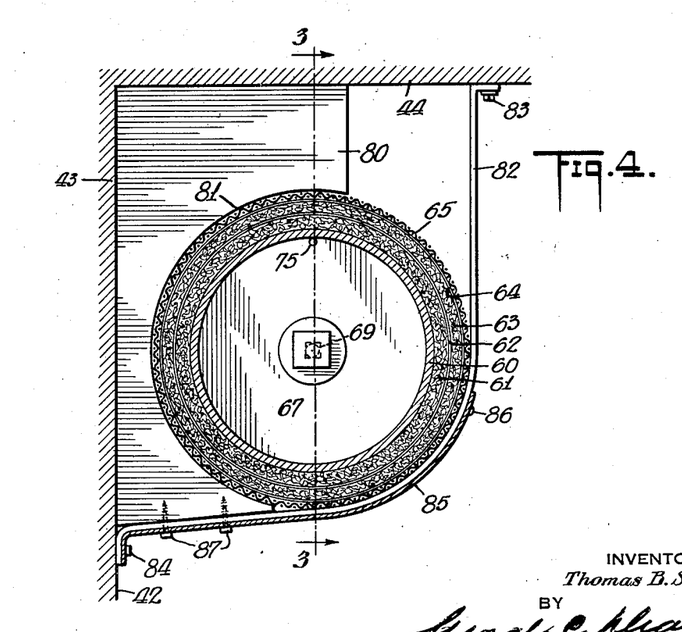
Fig. 4 is a vertical section on the line 4—4 of Fig. 3.

These containers were made self-governing, preferably, for a temperature of about 33° F., but by my invention they may be designed for lower or higher temperature operation. The inner cylinder 60 may be of galvanized sheet iron, about $\frac{1}{16}$th inch thick, affording heat conduction sufficient to keep its entire area at reasonably constant temperature so long as there is any substantial amount of solid remaining in the container along the bottom thereof. Making the cylinder 60 of thicker iron or of aluminum would result in still greater uniformity with still less solid in the container. The insulation may consist of a layer 61 of commercial hair felt normally about 1 inch thick, but wrapped on and compressed by adhesive tape 62 to a thickness of about ½ inch. Over this is shown a second, similar layer of hair felt 63, held compressed by a second layer of adhesive tape 64, and the whole is covered with a layer of canvas or other carefully waterproofed fabric 65. In this case, the amount of insulation was enough so that frost collected thereon and evaporated therefrom in amounts varying with small temperature changes at and near the freezing point of water, during normal operation with the car closed, but it all melts almost immediately when exposed to external atmosphere at normal temperature, say 60° F.

The cylinders may be slightly inclined so as to be self-draining when opened and emptied. The ends of the cylinder 60 may be closed, and heat insulated in any desired way, as by two similar closures, each consisting of a pair of discs 66, 67, preferaby of balsa wood, each about 2 inches thick and chamfered as at 72 to afford recesses for an annular packing 73 about ⅝ inch to one inch in diameter, which is adapted to be wedged radially into airtight frictional engagement with the cylinder 60, by forcing together the discs 66, 67, as by means of a central bolt 69 having a head engaging a washer and having a squared shank closely fitting a squared recess in the disc 67. The threaded portion 70 projects through the disc 66 and is provided with a lever nut 71, provided with a handle for rotating it. Thus held, the heads can be forced out without damage, in case of undue rise of internal pressure, as by freezing of gas outlet through passages 75, 75a. These passages are say ⅛ to ⅜ inch in diameter, extending through the discs 66, 67, near the uppermost edges thereof and the inner vent 75 drains by overflow from the topmost level of the gas within the container. These vents may be designed for any desired jet velocity for mechanical mixing in the atmosphere, but are preferably large enough to vent the interior and prevent too great internal pressures, subject to the limitation that their length and flow resistance should be duly proportioned with respect to normal sublimation rate and resulting output of gas, so that in operation the flow will always be from the interior to the exterior, thereby avoiding inbreathing of moist air from the outside. Otherwise, in-breathing air and moisture would accelerate the evaporation rate, and the moisture would freeze within the container, materially increasing the heat insulation of the solid carbon dioxide therein and in certain cases freezing up the vent sufficiently to cause irregularity of action, besides possible accumulation of dangerous internal pressures.

The interspace 68 between the discs 66, 67, is an added safeguard, since even if moisture does diffuse through the outer perforation 75a, it will be frozen and trapped in the interspace, instead of inside the container.

These containers may be securely held in the desired position as shown in Fig. 4, by providing a plurality of bearing blocks 80, each having a concave seat 81 for about one-half the cylinder circumference. The cylinder is securely held in contact with these seats and its weight partially supported by straps 82 secured to the ceiling 44 by suitable bolts 83 and to the side wall 42 by bolts 84.

As the exterior heat absorbing surface 65 will collect dew or frost under conditions previously described, it is desirable to prevent drip upon the merchandise being transported as by providing a sheet metal shield or drip trough 85, which may be conveniently secured to the exterior of the straps 82 by rivets as at 86; and by securing bolts 84 and screws 87.

The outlets 75, 75a are preferably open from the highest points so as to take the lightest gas, particularly all air and moisture from the spaces vented by each, and they may be inclined so as to drain toward the exterior as shown. The interspace 68, being continuously supplied with cold fresh gas, is the best possible non-conducting protection for the interior of the container.

In practice, water ice and frost within the container were found to be very detrimental because it is a relatively poor conductor of heat and operates irregularly to vary the normal rate of flow of heat from the metal to the solid carbon dioxide. For instance, if the solid carbon dioxide contained, or rested upon, water ice, the solid carbon dioxide would evaporate until the mass was resting on the non-melting water ice and the solid carbon dioxide being thus insulated from contact with the metal container, would not be supplied with sufficient heat and would not melt fast enough. Frost anywhere within or without the container would have the same insulating effect and when melted, the water produces the opposite effect. For this reason, the hair felt insulation was wrapped on tightly to minimize in and out breathing of the moist air and was enveloped in waterproof fabric to prevent wetting.

It will be understood that the desirable feature of a relatively dry atmosphere in the car is not inconsistent with having it contain substantial moisture. While my invention is independent of theory, it is evident that if the escaping anhydrous gas flows directly into contact with water in liquid form or in less degree in frozen form, such gas becomes more or less saturated at below zero or even below freezing temperatures. The fresh cold gas soon displaces the moistened gas upward, and, at the relatively higher temperatures in the refrigerator atmosphere, the same or even a greater water content, is then insufficient to saturate it, because its saturation capacity has become greater at the higher temperature. However that may be, the atmosphere deposits part of its moisture content as frost on the cold surfaces of my containers until some sort of a steady temperature moisture equilibrium or condition is produced, where temperature changes at and near the freezing point are particularly effective for varying the heat absorption rate at said surfaces.

This condition may be and normally is established when the refrigerator atmosphere is so far from saturated, that it tends to have a slight drying effect on the contents and walls of the lower part of the refrigerator, but it is evident that there is a minimum remnant of moisture which it is desirable to have in the car. As the atmosphere with all its moisture content is forced out of the car by perfectly anhydrous gas, at the rate of a car full every two days, more or less, some supply of moisture is necessary but some cargoes are wet enough so that such drying is beneficial rather than otherwise.

A car equipped as above and filled approximately half its height with unfrozen fish was found to be perfectly self-regulating within practical limits above the freezing point of the fish throughout a ten-day trip during which weather temperatures varied from below freezing during a snow storm in the mountains to summer temperatures at other points of the journey. Such refrigeration may consume solid carbon dioxide at an average rate of, say, 2 or 3 cubic feet per day, which would be about 200 to 350 pounds of dense solid. This rate of supply of refrigerant value is phenomenally small and was effective because the cold carbon dioxide gas operated to lower temperature and exclude oxygen to a point where heat production by reaction within the perishable products was practically eliminated. The above relatively small amount of refrigerant, yields nearly a car full of gas per day and, allowing for the space occupied by the packing, vessels and cargo, it is evident that the cargo was submerged in carbon dioxide gas within a very few hours and that the entire atmosphere within the car was renewed many times during the trip by the continuous supply of fresh gas from the containers. The same equipment will preserve the temperature for a correspondingly less time if each container is loaded with less of the solid, say, three blocks each containing one cubic foot of the solid, as indicated in Fig. 2.

On the other hand, if only three of the containers are charged, the temperature range will be raised somewhat without much decreasing the time the solid will last; and if only two are charged, the range will be raised still further.

As a contrast with this, it will be seen that no amount of water ice can give temperatures around 29° F., the desirable non-freezing temperature for fresh fish; also that when water ice is called upon to maintain a temperature only a degree or two above its melting point, there must be an enormous surface of the ice exposed and the air must be circulated thereover with relatively great rapidity. This entails great convection losses and necessitates re-icing long before the ice is gone, merely because its surface cooling area has become too small.

For all the above reasons, my method is commercially advantageous even where solid carbon dioxide costs several times as much as water ice and is a great economy where the cost is only twice as much per pound, because the refrigerant value cost is then approximately the same, but solid carbon dioxide does the work with less refrigerant value per day, and less days are required for the trip, besides saving labor costs for re-icing and the large minimum quantity of water ice which is thrown away at the end of every trip.

While I have shown the insulation as uniform for the entire surface of container 52, Fig. 1, this is not an essential. For instance, in Fig. 3 the disc-and-interspace closures afford relatively small areas having heat absorption rates quite different from those of the cylindrical surfaces, while the exposed ends of bolt 70 and sheet metal 60 constitute highly-conducting, all-metal paths though their quantity effects are small, because their exposed surface areas are such a minute fraction of the whole. Hence it will be evident that so far as concerns the broader aspects of my invention, the insulation need not be uniform over the whole surface or even over any considerable portion of it.

I have elected to disclose some of the important principles of my invention in connection with the simple apparatus shown herein, because this apparatus was actually built and operated by me and found to utilize in greater or less degree, all of the novel features herein claimed.

For best practice of the temperature control features of the invention, it was found desirable to manufacture by a separate process, solid carbon dioxide in the form of blocks free from objectionable impurities such as condensed water or lubricating oil, the blocks having dense, smooth surfaces, cylindrical in cross section, about twelve inches in diameter so as to fit the containers, and about twelve to fourteen inches long so as to contain about 100 pounds of carbon dioxide. The surfaces rapidly collect frost from the atmosphere but being smooth and dense the frost may be cleaned off before charging the blocks into container. The latter may also be freed from ice and its atmosphere then dried by a preliminary freezing out with carbon dioxide, but the latter precaution is usually unnecessary. While the above perfections as to purity of the frozen carbon dioxide are desirable for best practice of my invention, it will be evident that the same principles may be applied in the use of solidified carbon dioxide with almost any admixture of other liquids or materials, provided the product is standardized within limits which will permit designing apparatus to suit the evaporating temperature and the refrigerant values of such composite products.

An important commercial application of the principles of my invention is shipment of fresh fruit, vegetables, etc., from summer regions into winter regions. In such case a car equipped for long-period, hot weather refrigeration may have its water containers supplied and each of its refrigerant containers loaded with solid carbon dioxide sufficient for the number of days it will take the car to traverse the hot country and reach freezing temperatures. Thus loaded the solid will begin to fail at the time the car should reach cold weather. In actual practice, the standard refrigerator car is so heavily insulated that when once refrigerated to, say 27° to 33° and with sufficient carbon dioxide gas in its atmosphere, the cargo will be safe for, say 48 hours, as against an outside temperature as high as 50° F. or as low as 15° F. As against freezing during the transition period, there is the margin of 48 hours immunity and the water in the containers will prevent freezing of the cargo during the remainder of the trip. Such bodies of water will make it practical to have a further margin of safety by employing a reasonable over-supply of the refrigerant so that the calculated refrigeration period may substantially overlap the expected beginning of the winter weather conditions.

I claim:

1. A refrigerator and a plurality of similar suitably insulated metal lined containers therein for refrigerating perishable products without freezing them, each said container being of suitable capacity for enclosing cakes of frozen carbon dioxide, of relatively great surface area as compared with its capacity and heavily insulated to preserve the same for a long period and each deriving heat from and discharging the resultant cold gas into the upper part of the atmosphere containing said products, the insulation of each container being predetermined with reference to the freezing point of water so as to insure relatively small temperature drop between said atmosphere and the heat absorbing surfaces of the container when said atmosphere is near said freezing point.

2. A refrigerator and a plurality of similar suitably insulated containers therein for refrigerating perishable products without freezing them, each said container being of suitable capacity for enclosing cakes of frozen carbon dioxide sufficient for a long period and each deriving heat from and discharging the resultant cold gas into the upper part of the atmosphere containing said products, the insulation of each container being predetermined with reference to the freezing point of water so as to insure relatively small temperature drop between said atmosphere and the heat absorbing surfaces of the container when said atmosphere is near said freezing point, each container being of relatively small diameter compared with its length, arranged horizontally near the ceiling or roof of the refrigerator and means to render the temperature of the outer surface of the insulation substantially independent of the volume of solid in the container.

3. A refrigerator and refrigerating means therein including container means of storage capacity and heat insulation suitable for refrigerating at moderate temperatures for long periods by means of solid carbon dioxide absorbing heat from and venting its refrigerant gas into the atmosphere of said refrigerator; said container means having large-area heat absorbing surfaces as compared with its capacity, in conducting relation between the solid and the atmosphere in the refrigerator, the walls of the container including an inner surface which is of good heat conducting material upon which the solid carbon dioxide rests and maintains intimate contact by gravity as it melts, and an outer protecting layer of slowly conducting insulating material whereby said inner layer is maintained at approximately constant temperature so long as any substantial amount of the solid carbon dioxide remains in the container, the amount of said insulation being considerable and predetermined with reference to the freezing point of water so that the temperature drop between the refrigerator atmosphere and the heat absorbing surfaces is small when said atmosphere is near said freezing point, and the amount of such surface being proportioned for the desired rate of refrigeration as determined by the heat absorption rates of the refrigerator and by the temperatures to be maintained therein.

4. A refrigerator car in combination with means within the car for refrigerating it at moderate temperatures by means of solid carbon dioxide, said means including large-capacity highly and permanently insulated containers located and shaped so as to extend to points adjacent the ends of the car each having a gas outlet into the car and having heat transfer walls comprising an interior metal surface upon which the solid carbon dioxide rests by gravity, and a permanent exterior insulating covering for slow conduction of heat to said metal from the refrigerator atmosphere.

5. A refrigerator car or the like, in combination with means for refrigerating it at moderate temperatures for considerable periods by relatively large initial charges of solid carbon dioxide, said means including tubular containers for said solid, of great length as compared with their diameter, each absorbing heat and discharging the resultant gas into the car and each having walls with an interior metal surface on which the solid rests and an exterior insulating covering for slow conduction of heat to said metal from the refrigerator atmosphere, the upper heat absorbing surfaces of said containers being near but substantially below the ceiling of the car.

6. A refrigerator car or the like, in combination with means for refrigerating it at moderate temperatures for considerable periods by large initial charges of solid carbon dioxide, said means including several large-capacity, large-area containers as compared with their holding capacity, each having a normally open gas outlet into the car and comprising an interior metal surface and an exterior permanent heavily insulating covering for slow conduction of heat to said metal from the refrigerator atmosphere, said containers being disposed horizontally near but below the ceiling of the car.

7. A refrigerator car or the like, in combination with means for refrigerating it at moderate temperatures by means of solid carbon dioxide, said means including relatively long tubular containers each having a normally open gas outlet into the car and having walls with an interior metal surface and an exterior permanent heavily insulating covering for slow conduction of heat to said metal from the refrigerator atmosphere and arranged horizontally, lengthwise of the car, near but not in contact with the side walls and ceiling thereof.

8. A refrigerator car or the like, in combination with means for refrigerating it at moderate temperatures by means of solid carbon dioxide, said means including tubular containers each long as compared with its diameter and having a normally open gas outlet passage into the car and each container comprising an interior metal surface and an exterior permanent heavily insulating covering for slow conduction of heat to said metal from the refrigerator atmosphere, said outlet passages being of length and flow capacity adapted for continuous slow out-flow of gas, under normal conditions of operation; said outlet passage traversing a relatively large volume chamber serving as a trap against moisture from the exterior.

9. A refrigerator car of a type having doors midway of the sides, in combination with means for refrigerating it at moderate temperatures by means of solid carbon dioxide, said means including at least four relatively long tubular containers each having an interior metal surface and an exterior insulating covering for slow conduction of heat from the exterior surface to said metal; said containers being disposed lengthwise of the car, arranged two on each side of the doorway near but not in contact with the side walls and ceiling of the car, and each having a removable closure and a small normally open vent discharging at the end adjacent said doorway.

10. A refrigerator car of a type having doors midway of the sides, in combination with means for refrigerating it at moderate temperatures by means of solid carbon dioxide, said means including relatively long tubular containers comprising interior metal surfaces and exterior insulating coverings of tightly held hair felt, for slow conduction of heat to said metal and a removable end closure, opening the full area of the container; said containers being disposed lengthwise of the car near but below the ceiling thereof, with their closures presented toward the middle of the car.

11. The method of refrigeration which consists in enclosing within a chamber with the material to be refrigerated, a quantity of permanently and heavily insulated solid carbon dioxide which on absorption of heat from the atmosphere within the chamber, passes directly from the solid to the gaseous state, and permitting all the gas thus formed to escape into the atmosphere of said chamber in the upper part thereof; and predetermining the temperature range of the refrigeration near the freezing point of water by predetermining the amount of active heat absorbing area of the container to the size and average heat absorption rate of said enclosing chamber; and by maintaining moisture in the atmosphere of said enclosing chamber for the formation of insulation varying frost on the containers at critical temperatures.

12. A refrigerator and a plurality of permanently insulated containers therein lined with highly heat conductive material so that their internal temperature is substantially independent of the amount of solid which they contain, each adapted to enclose cakes of frozen carbon dioxide sufficient for a long period, but only part of them containing the same and each deriving heat from and discharging the resultant cold gas into the refrigerator atmosphere, the surface area of the insulated containers being great as compared with their capacity, the amount of insulation of each container being correspondingly great so that its outer surface will collect frost from the refrigerator atmosphere at the freezing point of water, thereby further insulating the container and will permit melting of such frost thereby decreasing the insulation when said atmosphere is at a temperature above the range for which refrigeration is desired.

13. The method of refrigeration which consists in enclosing within a chamber with the material to be refrigerated, a quantity of suitably insulated solid carbon dioxide which on absorption of heat from the atmosphere within the chamber, passes directly from the solid to the gaseous state, rendering the rates of said heat absorption practically independent of decrease in the amount of said solid by supporting the solid upon good conducting material, of much greater area that the solid, permanently and heavily insulating the heat absorbing surfaces; and controlling the temperature range of the refrigeration by proportioning the amount of active heat absorbing area of the insulation to the size and average heat absorption rate of said enclosing chamber.

14. The method of refrigeration which includes discharging intensely cold, anhydrous, refrigerant gas directly into the atmosphere of the refrigerator and limiting low temperatures attainable by action of such gaseous refrigerant,—by permitting said gaseous refrigerant to come into heat exchanging relation with a mass of water maintained in the refrigerated space.

15. The method of refrigeration which includes utilizing suitably insulated solid carbon dioxide, refrigerating partly by direct absorption of heat from the refrigerator atmosphere, and partly by discharging therein the resultant cold carbon dioxide gas, and which includes limiting minimum temperatures by permitting said gaseous refrigerant to come into heat exchanging relation with a mass of water maintained in the refrigerated space.

16. A refrigerator and suitably insulated containers for solid carbon dioxide refrigerating partly by direct heat absorption from the refrigerator atmosphere, and partly by discharging therein the resultant cold carbon dioxide gas in combination with means for supporting the materials to be refrigerated above the lowermost part of the refrigerator atmosphere and means for maintaining below said support, bodies of water having large heat absorbing area.

17. A refrigerator car or the like, in combination with means for refrigerating it at moderate temperatures for considerable periods by large initial charges of solid carbon dioxide, said means including a number of large capacity containers each having an interior metal lining upon which the solid carbon dioxide rests and an exterior permanently, heavily insulating covering for slow conduction of heat from the refrigerator atmosphere to said metal; and an outlet to said atmosphere for the resultant gas, as formed, each container having its insulation, heat absorbing area and refrigerant storage capacity proportioned to afford its predetermined rate of refrigeration for the longest period of refrigeration for which the car is designed; and the aggregate number of such containers being sufficient for the lowest temperature range for which said car is designed; whereby said car may be initially charged for shorter periods and the same temperatures by less of the solid in each container; or, for higher temperatures, by charging fewer containers.

18. The method specified by claim 14 with the further feature that the insulation of the heat absorbing surfaces and the total area of said surfaces are designed to maintain refrigerator temperatures within a few degrees of the freezing point of water; that the product being refrigerated is fresh fish; that the fish are kept moist and moisture maintained in the surrounding atmosphere by means of slowly melting water ice packed with the fish.

19. The method which includes refrigerating cargoes of products that generate heat by so-called ripening or decay reactions, by enclosing in a chamber with and substantially above the level of the products, a suitably insulated supply of solid carbon dioxide refrigerating at and above water-freezing temperatures by absorbing heat from and setting up local convection currents in the atmosphere above said products and also by liberating cold carbon dioxide gas flowing down, spreading under and rising among said products, at temperatures and in quantities sufficient to slow said reactions to a point where the heat generation becomes a practically negligible part of heat to be refrigerated against.

20. The method which includes refrigerating cargoes of products that ordinarily generate heat by so-called ripening or decay reactions, by enclosing in a chamber substantially above the level of the products, a suitably insulated supply of solid carbon dioxide absorbing heat from and setting up relatively slow atmosphere convection flow localized in the atmosphere above said products and liberating cold carbon dioxide gas and utilizing the moisture in the refrigerator atmosphere to control convection refrigeration of the upper part of said atmosphere for a desired low temperature, above the freezing point of the products, by and in accordance with the freezing point of the moisture and controlling also the more intense refrigeration by said carbon dioxide gas, so as to maintain approximately the same desired temperature within the refrigerated products.

21. The method which includes refrigerating cargoes of products that ordinarily generate heat by so-called ripening or decay reactions, by enclosing in a chamber substantially above the level of the products, a suitably insulated supply of solid carbon dioxide absorbing heat from and setting up relatively slow atmospheric convection flow localized in the atmosphere above said products and liberating cold carbon dioxide gas where it can flow down to the bottom portion of said atmosphere without substantial interference from said atmospheric convection; the amounts of insulation and the heat absorbing area for the solid carbon dioxide being designed for utilizing the moisture in the refrigerator atmosphere to control convection refrigeration of the upper part of said atmosphere for a desired low temperature, above the freezing point of the products, by and in accordance with the freezing point of the moisture and controlling also the more intense refrigeration by said carbon dioxide gas, so as to maintain approximately the same desired temperature within the refrigerated products.

22. The method of operating a refrigerator car for protection of cargoes of fresh fruit, vegetables, etc., against heat and cold during a trip beginning in a warm weather region and ending in a freezing weather region, which method includes supplying the car with an initial supply of refrigerant for the warm weather part of the trip and during the intermediate and last part of said trip by permitting said gaseous refrigerant to come into heat exchanging relation with a mass of water maintained in the refrigerated space.

23. The method of operating a refrigerator car for protection of cargoes of fresh fruit, vegetables, etc., during a trip involving freezing as well as warm weather conditions, which method includes chilling the cargo and displacing two-thirds to four-fifths of the air by cold carbon dioxide gas and during freezing weather conditions by permitting said gaseous refrigerant to come into heat exchanging relation with a mass of water maintained in the refrigerated space.

24. In a refrigerating system, the combination of a chamber to be refrigerated, a plurality of containers of cakes of frozen carbon dioxide within the chamber, each container being formed of or including substantial insulating means, the capacity and insulation of the containers being proportioned to the total capacity and contents of the chamber to be refrigerated so as to effect the required amount of refrigeration by latent heat absorption and by the escaping carbon dioxide gas attendant upon and resulting from the evaporation of the frozen carbon dioxide within said container, said containers being located and absorbing said heat from the atmosphere in a plurality of substantially different regions in said chamber, for the purpose described.

25. In a refrigerating system, the combination of a chamber to be refrigerated, a plurality of containers of cakes of frozen carbon dioxide within the chamber, each container being formed of or including substantial insulating means, the capacity and insulation of the containers being proportioned to the total capacity and contents of the chamber to be refrigerated so as to effect the required amount of refrigeration by latent heat absorption and by the escaping carbon dioxide evaporation of the frozen carbon dioxide evaporation of the frozen carbon dioxide within said container, said containers being located and absorbing said heat from the atmosphere in a plurality of substantially different regions in said chamber, and discharging said gas in regions different from those of the heat absorption, for the purpose described.

26. In a refrigerating system, the combination of a chamber to be refrigerated, which is of great length as compared with its height, a plurality of containers of cakes of frozen carbon dioxide within the chamber, each container being formed of or including substantial insulating means, the capacity and insulation of the containers being proportioned to the total capacity and contents of the chamber to be refrigerated so as to effect the required amount of refrigeration by latent heat absorption and by the escaping carbon dioxide gas attendant upon and resulting from the evaporation of the frozen carbon dioxide within said container, said containers being elongated and extending to and absorbing heat in relatively remote regions of said chamber.

27. Refrigerating apparatus, including a heat insulated container for a product to be refrigerated, solidified carbon dioxide within said container, in combination with a supply of liquid or frozen water exposed to the atmosphere within said container.

28. Refrigerating apparatus, including a heat insulated container for a product to be refrigerated, solidified carbon dioxide within said container, in combination with water ice packed with the products to be refrigerated, in moisture imparting relation to the atmosphere within said container.

29. A refrigerative method which includes evaporating solid carbon dioxide in a heat insulated chamber, by heat transfer from the atmosphere or products to be refrigerated therein; discharging gas evaporated from said solid into the atmosphere of said chamber and circulating said atmosphere, including said gas, in moisture absorbing relation to liquid or frozen water and to said products.

30. A method of refrigerating products that deteriorates by exposure to dry carbon dioxide gas, which method includes packing said products with water ice in a heat insulated chamber; producing very cold dry carbon dioxide gas from solid carbon dioxide by transferring heat thereto from the region of products to be refrigerated; discharging said gas into the atmosphere of said chamber and circulating said atmosphere, including said gas, in moisture absorbing relation to said products and said water ice.

31. A refrigerated chamber of greater length than width, enclosing solid carbon dioxide containers each of greater length than width and means for discharging the evaporated cold gas from said containers from a level substantially above that of the solid carbon dioxide therein; said containers being disposed lengthwise along the walls of said chamber adjacent the top thereof.

32. A refrigerator and a plurality of solid carbon dioxide containers therein for refrigerating perishable products, each said container being of suitable capacity for enclosing a supply of solid carbon dioxide and each absorbing heat from the upper part of the atmosphere containing said products and means whereby the resultant cold gas is discharged in heat exchange relation with the space or products to be refrigerated, said containers being elongated so as to be of great length and have great heat absorbing area as compared with their capacity.

33. A method of reducing the amount of solid carbon dioxide required for refrigerating products that generate heat by ripening or by decay reactions, which includes enclosing in an insulating container with the product, a supply of solid carbon dioxide and insulating the products from the solid sufficiently to prevent freezing of the products while absorbing in the solid heat derived from said products to evaporate the solid, at temperatures and in quantities sufficient to prevent or substantially retard said heat generating reactions within the product, whereby the refrigerant values are mainly applied for absorption of heat leaking into said insulating container from the exterior.

Signed, at Glendale, in the county of Los Angeles, and State of California, this 6th day of February, A. D. 1931.

THOMAS B. SLATE.